United States Patent Office 3,725,260
Patented Apr. 3, 1973

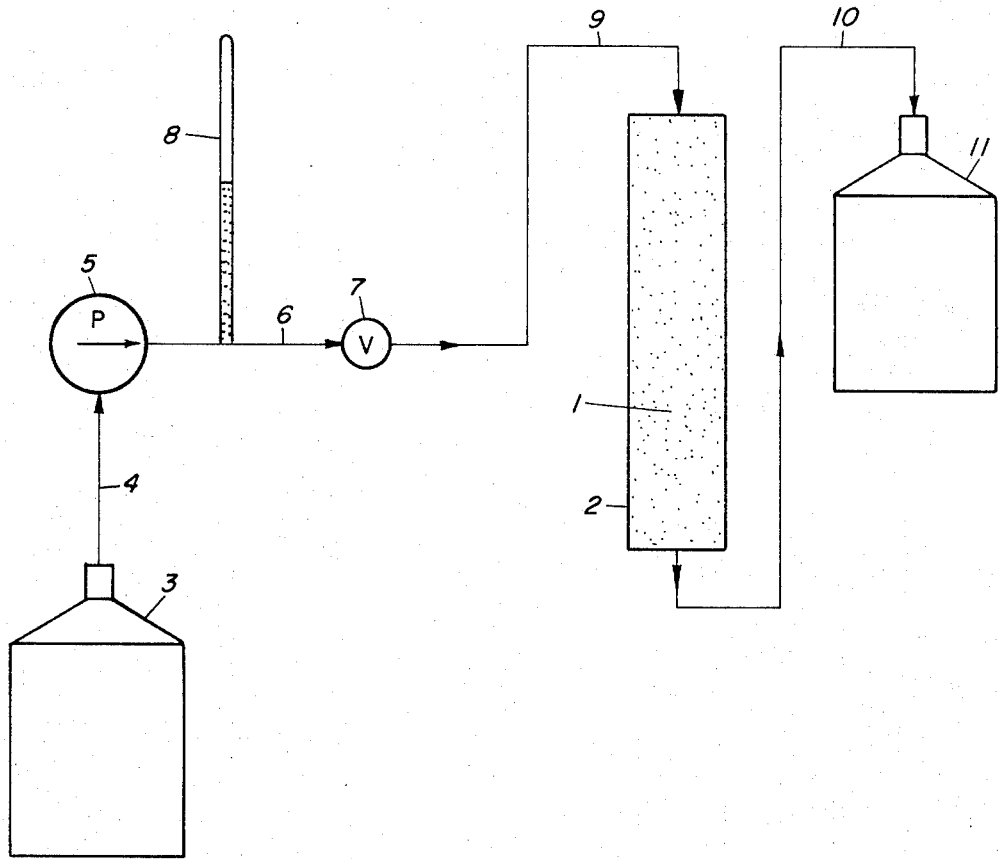

3,725,260
SEPARATION OF PESTICIDES FROM LIPIDS BY GEL PERMEATION CHROMATOGRAPHY
David L. Stalling and Roger C. Tindle, Columbia, Mo., assignors to the United States of America as represented by the Secretary of the Interior
Filed Dec. 28, 1971, Ser. No. 213,118
Int. Cl. B01d 15/08
U.S. Cl. 210—31 C
2 Claims

ABSTRACT OF THE DISCLOSURE

Cleanup of lipid samples, for subsequent analysis of pesticide content, is accomplished by means of gel permeation chromatography. The gel employed comprises a styrene-divinylbenzene copolymer and cyclohexane, with cyclohexane also serving as solvent for elution of the sample.

---

The invention relates to preparation of samples of fish extracts for determination of pesticide concentrations. Pesticide analysis is conventionally carried out by various means such as gas-liquid chromatography, combined gas-liquid chromatography-mass spectrometry, thin-layer chromatography, $\mu v$ spectrometry, I.R. spectrometry, fluorescence spectrometry, and polarography. However, such analyses generally require initial cleanup of the sample to remove a large percentage of the sample material other than the pesticide. It is, therefore, an object of the invention to effect an efficient cleanup of pesticide-containing samples prior to analysis by means of the above procedures, particularly for gas-liquid chromatographic analyses.

Fish extract samples are obtained by conventional means such as extraction of ground whole fish by means of organic solvents such as hexane, diethyl ether, petroleum ether, chloroform, methanol, acetonitrile, benzene, cyclohexane, acetone, and various combinations of these solvents. For purposes of the invention, cyclohexane, or a mixture of chloroform and methanol, have been found to be particularly effective for extraction of whole fish. Samples obtained by such extraction consist largely of lipids, with about 0.1 to 30.0 micrograms of pesticides per gram of lipid also being present. Thus, the weight of lipid in the samples is of the order of 500,000 times that of the pesticide and even a slight overlap in lipid-pesticide separation may result in unacceptable amounts of lipid in the fraction used for pesticide analysis. Cleanup of the samples, therefore, consists essentially of removal of a large fraction, i.e., 99.5 percent or more, of the lipid portion of the sample.

The pesticide may consist of any, or a mixture of, common pesticides such as endrin, methoxychlor, DDE, DDD, DDT, lindane, dieldrin, malathion, parathion, etc. These materials are characterized by molecular weights of about 200 to 400, or by a high percentage of chlorine resulting in a more compact molecule. The lipids, on the other hand, have molecular weights of about 600 to 1500, thus providing for separation on the basis of difference in molecular volumes.

Various cleanup procedures have previously been employed for pesticide residue analysis. These include adsorption chromatography, using Florisil (magnesium silicate), charcoal Celite (diatomaceous earth) mixtures or alumina as adsorbents, liquid-liquid partitioning, volatilization and low temperature precipitation of lipids. However, these methods have generally resulted in a pesticide residue analysis that is of questionable accuracy, sensitivity or specificity.

It has now been found that these deficiencies of the prior art processes may be largely overcome by the use of a cleanup procedure utilizing gel permeation chromatography in which a specific solvent and a specific type of adsorbent are employed. The solvent consists of cyclohexane, preferably redistilled to a purity of about 99.9 percent.

The adsorbent consists of a copolymer of styrene and divinylbenzene having a molecular weight of about 100,000 to 1,000,000. This copolymer is conventionally prepared by suspension polymerization at a temperature of about 70° C. to reflux temperature, using about 1 percent benzoyl peroxide as initiator. The resulting polymer consists of a polystyrene chain crosslinked with divinylbenzene. Particularly good results have been obtained with a copolymer having a nominal crosslinking of about 2 percent, the copolymer being formed from a monomer mixture containing about 2 percent by weight of divinylbenzene. This coplymer is available commercially as Bio Beads S–X2, a product of Bio Rad Laboratories, Richmond, Calif.

The copolymer is employed in the form of a swollen gel prepared from beads of the copolymer having a mesh size of about 200–400. About 50 g. of the beads are slurried in 200–400 ml. of cyclohexane and the mixture allowed to stand for a period of about 18 to 24 hours, suitably overnight, at room temperature to expand or swell the polymer. The resulting gel slurry is then poured, or otherwise introduced, into the chromatographic column.

The chromatographic system, other than the specific solvent and adsorbent of the invention, is conventional and many variations in the type and arrangement of components of the system will be apparent to those of ordinary skill in the art. A typical system is diagrammatically illustrated in the figure and the process of the invention will be more specifically described by reference to the figure.

The cyclohexane-copolymer gel 1, prepared as described above, is contained in column 2. Solvent 3 is pumped via line 4, pump 5 and line 6 to sample introductory valve 7. Pulse damper 8, consisting of a hollow chamber or tube partially filled with solvent, is employed to minimize pressure changes. The sample introductory valve consists of a four-way Teflon-bypass valve filled with a Teflon adaptor for hypodermic syringe, and provides for introduction of the sample into the solvent stream. From this valve the sample and the solvent flow via line 9 to the chromatographic column where separation of pesticides and lipids takes place. Solvent containing the pesticide and lipid fractions is then eluted via line 10 and collected in collection bottle 11.

As the sample moves down the column, the lipid and pesticide fractions are separated as a result of the greater retardation of the smaller molecules, i.e., the pesticides. Hence the lipid fraction is eluted first. The fraction of eluate containing substantially all of the pesticide will, of course, vary considerably depending on the nature and amount of the pesticide and lipid, the specific adsorbent, i.e., its molecular weight and extent of crosslinking, size of the chromatographic column, flow rate of the solvent, size of the sample, etc. and is best determined empirically. However, generally the pesticides are recovered quantitatively in the 100 to 400 ml. eluate, i.e., the sample collected after elution of 100 ml. of solution (solvent containing lipid) and up to elution of 400 ml. of solution.

Optimum length of the column will also vary with different samples, flow rates, etc. but lengths of about 20 to 27 cm. have been found to give good results. Suitable column diameters are about 1.5 to 3.0 cm. A column about 27 cm. long and 2.5 cm. in diameter has been found to be particularly effective.

Suitable solvent flow rates will usually range from about 1 to 4.5 ml./min., with about 3.5 to 4.5 ml./min.

being preferred. Flow rates much in excess of 4.5 ml./ min. are generally undesirable since they may result in compression of the gel bed.

Sample volumes may vary from about 2 to 5 ml., with samples of about 5 ml. generally being preferred. Concentration of lipid in the sample is suitably from about 0 to 125 mg./ml., with a concentration of about 100 mg./ml. generally giving very good results.

It has been found that the process of the invention enables recoveries of pesticides of greater than 95 percent, with less than 0.5 percent of the lipids recovered in the pesticide-containing eluate. In addition, the pesticides are recovered without significant alteration of isomer ratios in multicomponent pesticides.

The following example will serve to more particularly illustrate the invention.

EXAMPLE 50 g. of 200–400 mesh beads of a styrene-divinylbenzene copolymer of the type described above was soaked overnight in 300 ml. of cyclohexane, the latter having been redistilled in glass to a purity of 99.9 percent. The resulting gel was poured into a 2.5 cm. i.d. x 40 cm. glass column to form a gel bed 27 cm. in length. The column was incorporated in an apparatus of the type described above in which 0.215″ o.d. x 0.063″ i.d. polytetrafluoroethylene tubing was used to connect the components of the apparatus. The solvent pulse damper was constructed from a 24″ capped T line and the sample introduction valve consisted of a four-way Teflon bypass valve with a syringe adaptor.

A 5-ml. sample comprising cyclohexane as solvent and containing 1 μg. lindane, 2 μg. $^{14}$C-endrin, 2 μg. dieldrin, 2.5 μg. $^{14}$C-p,p′-DDT, 2.5 μg. p,p′-DDD, 2.5 μg. p,p′-DDE, 20 μg. methoxychlor, 50 μg. malathion, 60 μg. $^{36}$Cl-PCB's (Aroclors) and 350 mg. of lipid was introduced via the sample introduction valve and was eluted through the column by means of cyclohexane at a flow rate of 4 ml./ min. The liquid was obtained by extraction of ground whole rainbow trout with cyclohexane. The $^{14}$C and $^{36}$Cl-labeled compounds had specific activities of $5 \times 10^3$ and 70 d.p.m./μg., respectively, and were employed to enable measurement of pesticide recovery by means of a liquid scintillation counter.

Effectiveness of separation of pesticides and lipids was determined by collecting the eluate in 10 ml. fractions and measuring the weight of lipid and the radioactivity in each fraction. The weight of lipid was determined by evaporating half of each fraction in a tared vial and weighing. Radioactivity was measured by means of a liquid scintillation counter. It was found that the fraction from 100 to 400 ml. contained 97–99.5 percent of the pesticides and only 0.5 percent of the original lipid.

We claim:

1. A method for cleanup of pesticide-containing lipid samples prior to analysis of the samples for pesticide content, comprising removing at least about 99.5 percent of the lipids by means of gel permeation chromatography in which the sample is eluted by means of cyclohexane through a column consisting essentially of a gel of styrene-divinylbenzene copolymer in cyclohexane, in order to separate lipids from pesticides by selective flowrate through the column.

2. The method of claim 1 in which the styrene-divinylbenzene copolymer has a molecular weight of about 100,000 to 1,000,000 and contains about 2 percent divinylbenzene.

References Cited

UNITED STATES PATENTS

| | | | |
|---|---|---|---|
| 3,326,875 | 6/1967 | Moore | 210—31 C |
| 3,467,595 | 9/1969 | Sten | 210—31 C |

JOHN ADEE, Primary Examiner